United States Patent
Chen et al.

(10) Patent No.: US 6,806,617 B1
(45) Date of Patent: Oct. 19, 2004

(54) CLAW-POLE ALTERNATOR ENHANCING POLE SURFACE

(75) Inventors: Hanyang Ben Chen, Ypsilanti, MI (US); Michael Timothy York, Chelsea, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/782,423

(22) Filed: Feb. 18, 2004

(51) Int. Cl.[7] .............................................. H02K 19/22
(52) U.S. Cl. ........................................................ 310/263
(58) Field of Search ........................... 310/263, 156.66, 310/156.69, 156.72, 156.73

(56) References Cited

U.S. PATENT DOCUMENTS

| | | | |
|---|---|---|---|
| 3,004,181 A | 10/1961 | Noddin | |
| 3,184,625 A | 5/1965 | Farison | |
| 3,493,800 A | 2/1970 | Barrett | |
| 5,270,605 A | 12/1993 | Lefrancois et al. | |
| 5,796,201 A | 8/1998 | Kamitani et al. | |
| 6,002,194 A | * 12/1999 | Asao | 310/269 |
| 6,034,464 A | * 3/2000 | Asao | 310/263 |
| 6,037,694 A | 3/2000 | Asao et al. | |
| 6,433,455 B1 | 8/2002 | Kometani et al. | |
| 6,522,046 B2 | 2/2003 | Ikeda et al. | |
| 6,570,289 B1 | 5/2003 | Liang et al. | |
| 6,617,715 B1 | 9/2003 | Harris et al. | |
| 6,617,717 B2 | 9/2003 | Okawa | |
| 6,707,227 B1 | * 3/2004 | York et al. | 310/263 |
| 2000/0125784 | 9/2002 | Bramson et al. | |

* cited by examiner

*Primary Examiner*—Tran Nguyen
(74) *Attorney, Agent, or Firm*—Brinks Hofer Gilson & Lione

(57) ABSTRACT

A rotor assembly for an alternator having a rotor shaft, a field coil wound on an insulative bobbin, and pair of poles mounted on the shaft around the field coil and bobbin. Each of the poles includes a pole core and a plurality of pole fingers. The plurality of pole fingers each have an inner surface facing the field coil. The plurality of pole fingers and their inner surface is structured to increase the electric output power if the alternator while decreasing the weight and volume of the alternator, thereby increasing the alternator maximum speed and reducing the deflection of the pole fingers.

20 Claims, 4 Drawing Sheets

US 6,806,617 B1

CLAW-POLE ALTERNATOR ENHANCING POLE SURFACE

FIELD OF THE INVENTION

The present invention relates generally to alternators for automotive vehicles, and more particularly relates to rotors used in such alternators.

BACKGROUND OF THE INVENTION

Currently, the majority of all vehicles driven today use front-end accessory drive alternators that contain Lundell style rotors, also known as "claw pole" rotors. The rotor provides the alternators magnetic field and rotates within the machine. The rotor includes a coil assembly having a field coil made up of an insulated copper wire or wires wrapped around an electrically insulating bobbin. The bobbin surrounds a steel hub, and insulates the field coil from the steel pole pieces which sandwich the field coil to form north and south poles. The magnetic field is generated when the field coil is energized and a current flows through the wires.

These alternators provide DC output current to charge batteries and support other electronic devices in vehicles. Modern automobiles include increasing amounts of electric demands such as for on screen displays, DVD players, radios, seat warmers and the like. Accordingly, more electric output power is required from the alternator especially at low or idle engine speeds (i.e. 400 rpm to 550 rpm). At the same time, the mass and volume of the alternator is expected to be the same or even smaller for vehicle efficiency considerations. Accordingly, there exists a need to provide an alternator that has increased electric output while minimizing the mass and volume of the alternator.

BRIEF SUMMARY OF THE INVENTION

One embodiment of the invention provides a rotor assembly for an alternator having a rotor shaft, a field coil wound on an insulative bobbin, and pair of poles mounted on the shaft around the field coil and bobbin. Each of the poles includes a pole core and a plurality of pole fingers. The plurality of pole fingers each have an inner surface facing the field coil. The plurality of pole fingers and their inner surface is structured to increase the electric output power of the alternator while decreasing the mass and volume of the alternator pole fingers, thereby increasing the alternator maximum speed by reducing the deflection of the claw pole fingers.

The inner surface of the inner plurality of pole fingers may be structured to have a first portion disposed at a first angle relative to the rotor shaft and a second portion disposed at a second angle relative to the rotor shaft. The first and second angles are different, the first angle preferably being less than the second angle. The first angle is preferably less than 18° and most preferably about 15°, while the second angle is preferably greater than 18° and most preferably is approximately 24°.

The field coil extends along at least a portion of the inner surface of the pole fingers. Preferably, the field coil extends along the first portion and along at least a part of the second portion of the inner surface. An outer surface of the field coil is shaped to correspond to the inner surfaces of the plurality of pole fingers. For example, the outer surface of a portion of the field coil may have third and fourth portions disposed at angles corresponding to the first and second portions of the inner surface. The plurality of pole fingers preferably exert a force on the field coil and deform the field coil into a corresponding shape.

Another embodiment provides a rotor assembly for an alternator comprising a rotor shaft, a field coil wound on an insulative bobbin, and a pair of poles mounted on the shaft around the field coil and bobbin. Each of the poles includes a pole core and a plurality of pole fingers. The plurality of pole fingers each have a pole root, a pole tip, and an inner surface facing the field coil. The inner surface has a curved shape increasing in slope from the pole root to the pole tip. The curved shape may be parabolic, exponential, or any other curve shape of increasing slope. The field coil preferably has an outer surface corresponding to the curved inner surface of the plurality of pole fingers, and the field coil is deformed by the pole fingers and extends along at least a portion of the inner surface of the pole fingers beyond the axial center of the two pole pieces.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
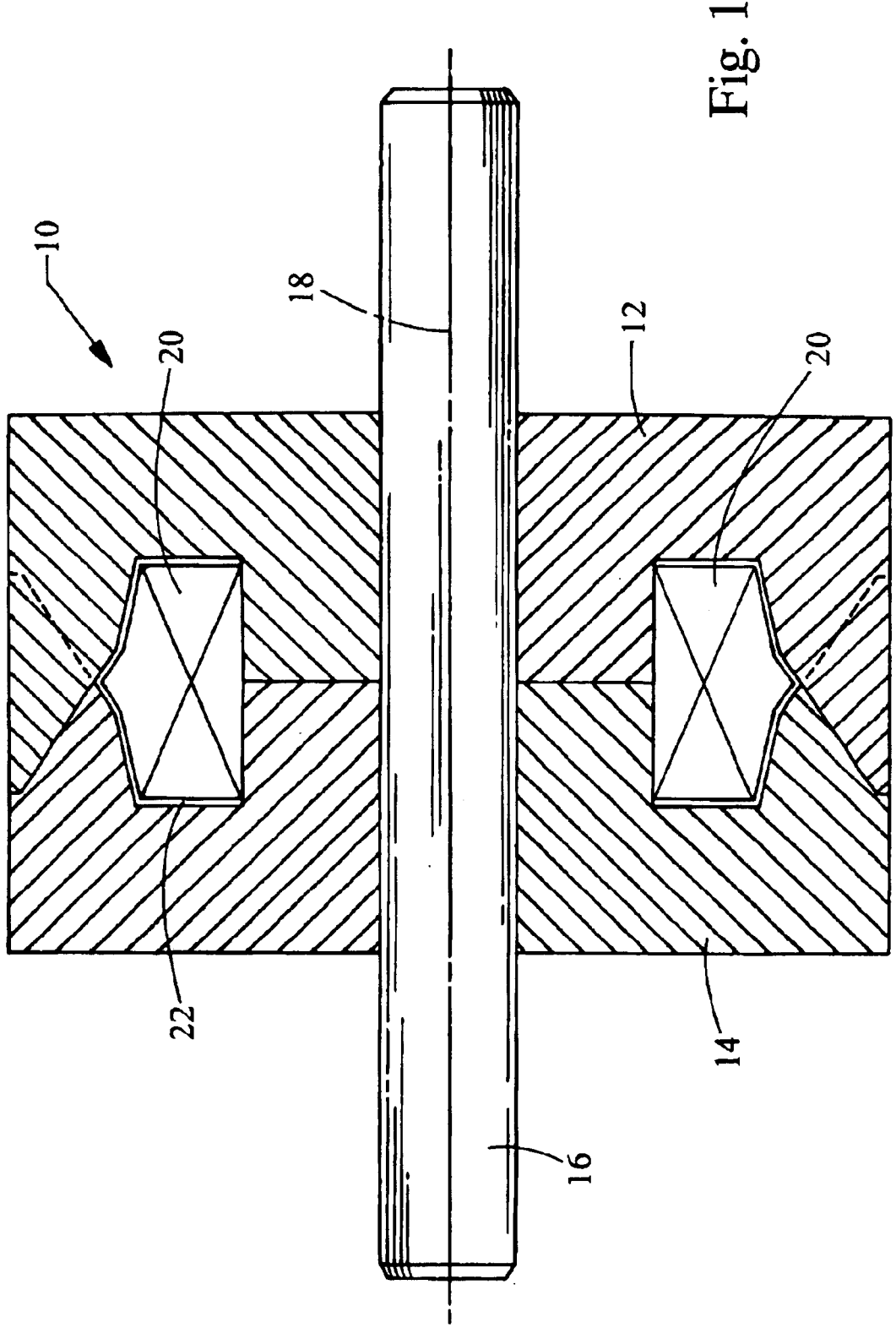
FIG. 1 is a cross-sectional view of a rotor assembly for an alternator constructed in accordance with the teachings of the present invention.

Turning now to the figures, FIG. 1 depicts a cross-sectional view of a rotor assembly 10 for an alternator (not shown) that can be used in an automobile. The rotor assembly 10 includes a first pole 12 and a second opposing pole 14. The poles 12, 14 are mounted on a rotor shaft 16 which is driven from an external source such as the engine of an automobile. The shaft 16 defines a central axis 18 about which the rotor assembly 10 rotates.

In the final assembly, the opposing poles 12, 14 are mated together as is shown in FIG. 1 to define an interior space housing a field coil 20. The field coil 20 is energized to create a magnetic field in the poles 12, 14. The field coil 20 is wound on a bobbin 22 which is constructed of a material which electrically insulates the field coil 20 from the metallic poles 12, 14.

Figure 2:
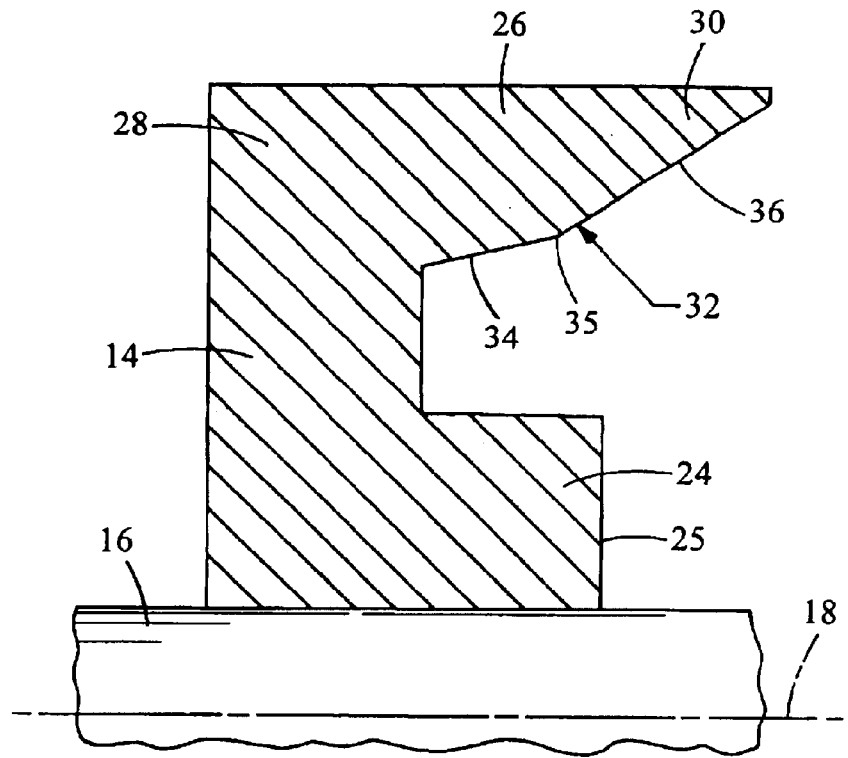
FIG. 2 is a cross-sectional view, partially cut away, of a single pole depicted in FIG. 1.

Turning now to FIG. 2, a cross-sectional view, partially cut away, is depicted showing a portion of the pole 14. Specifically, the upper half of the pole 14 has been shown, and this description is applicable to the remainder of the pole 14 as well as the entirety of opposing pole 12. The pole 14 includes a pole core 24 and a pole finger 26. The pole core 24 mates with the identically shaped pole core of pole 12, as is shown in FIG. 1. The pole core 24 has an end face 25 which abuts the opposing end face of the opposing pole 12 at a axial center of the rotor assembly 10. The pole finger 26 is one of a plurality of pole fingers formed on the pole 14. The plurality of pole fingers 26 are circumferentially spaced which allows the pole fingers 26 from the opposing pole 12 to fit therebetween, as is well known in the art.

Each pole finger 26 includes a pole root portion 28 and a pole tip portion 30. Each pole finger 26 further includes an inner surface 32 which faces the central axis 18, and more particularly the field coil 20. The inner surface 32 is structured to include a first portion 34 and a second portion 36. The first portion 34 is located in the vicinity of the pole root 28, while the second portion 36 is located in the vicinity of the pole tip 30. It can be seen in FIG. 2 that the transition point 35 between the first and second portions 34, 36 is offset from the axial center point of the rotor assembly 10 which can be denoted by the end surface 25 of the pole core 24, although it will be recognized that the transition point 35 may be located on center or offset on the opposing side of the pile finger 26. The first portion 34 of the inner surface 32 is disposed at an angle that is different than the angle of the second portion 36. The first portion 34 is preferably disposed at an angle relative to the central axis 18 that is less than the angle at which the second portion 36 is disposed relative to the central axis 18.

In the past, when the inner surface of the pole finger was disposed at a constant angle, experience had shown that an angle of approximately 18° was ideal. However, the Applicants have discovered that by decreasing the angle of the inner surface 32 at the root portion 28 of the pole finger 26, while increasing the angle of the inner surface 32 near the tip portion 30, provides several benefits. The first portion 34 of the inner surface 32 is preferably disposed at an angle relative to the central axis 18 that is less than 18°, and most preferably approximately 15.5°. The second portion 36 of the inner surface 32 is preferably disposed at an angle relative to the central axis 18 that is greater than 18°, and most preferably approximately 24°. The difference between the angles of the first portion 34 and the second portion 36 of the inner surface 32 is preferably at least 6°, and in the preferred construction is about 8.5°.

Figure 6:
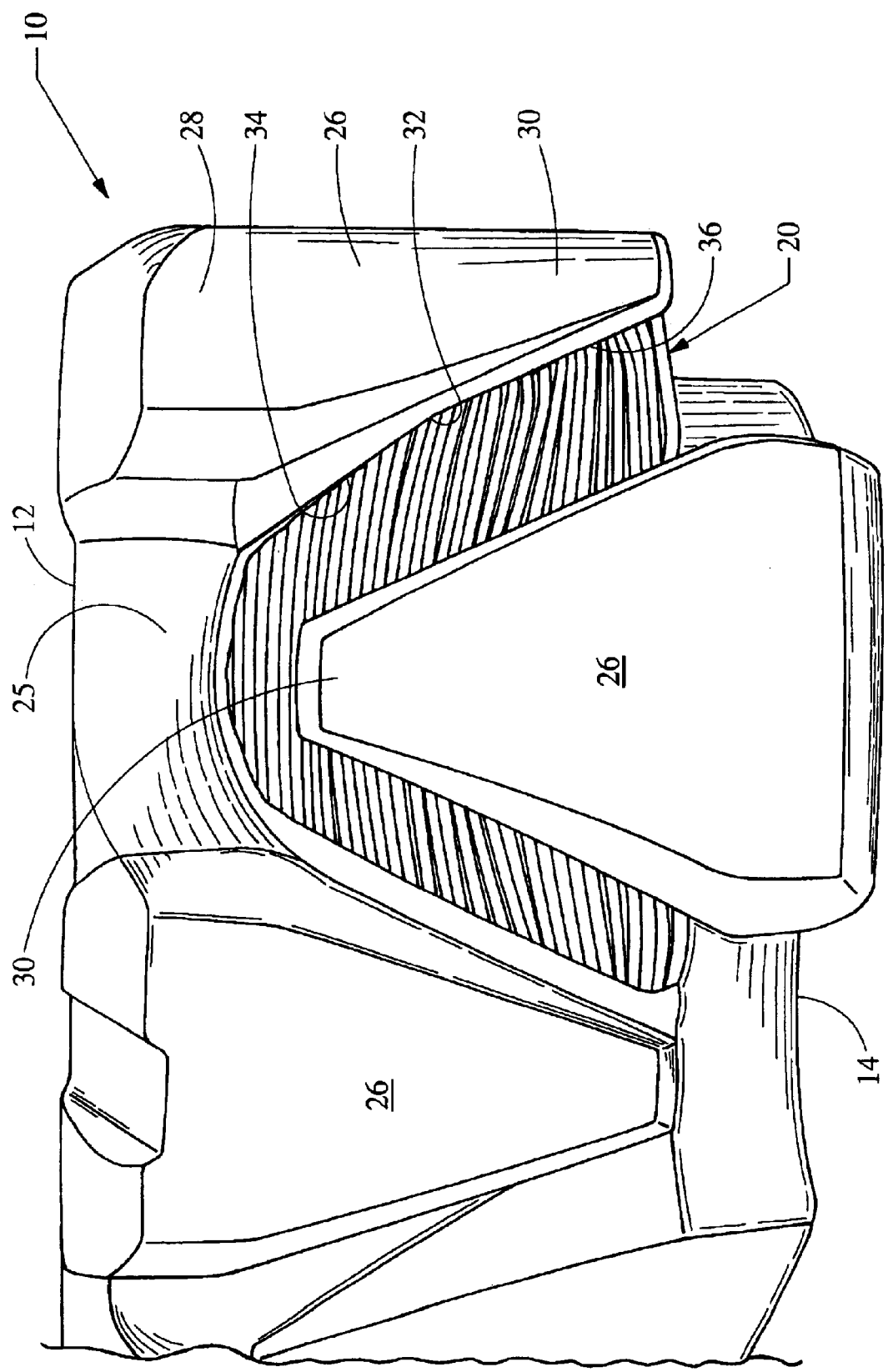
FIG. 6 is a front view, partially cut away, of the rotor assembly shown in FIG. 1.

The benefits of the pole construction are several fold. First, by decreasing the angle of the first portion 34 of the inner surface 32, the cross-sectional area of the pole finger 26 is increased in the pole root vicinity 28 allowing more magnetic flux to pass through the pole with lower magnetic saturation. Second, by increasing the angle of the inner surface 32 over the second portion 36 adjacent the pole tip 30, the distance of the magnetic leakage path between the pole tip 30 of one pole and the notch 25 between the pole fingers 26 of the opposite pole is increased, as is shown in FIG. 6. By increasing the distance of the magnetic leakage path, magnetic leakage is reduced. Accordingly, the increased magnetic flux and reduced magnetic leakage increases the output of the alternator.

Finally, the overall mass of the pole finger 26, and hence the poles 12, 14 and rotor assembly 10, is reduced. Based on the selected angles of the first and second portions 34, 36 of the inner surface 32, as well as location of transmission point 35, the overall cross-sectional area of the pole finger 26 is reduced, as is its mass. This reduction in mass results in several benefits, including that the overall mass of the rotor 10 is decreased, which in turn decreases the rotational inertia of the rotor assembly 10. This decrease in rotational inertia allows the rotor to be more easily started and stopped, as well as to more easily change its speed to accommodate changes in engine speeds. The reduction in mass also helps to eliminate belt slip which can cause audible noise. Furthermore, the reduction of mass, especially at the pole tip region 30, reduces the rotor tip deflection at high rotation speed. This reduction in centrifugal deflection of the rotor pole increases the maximal speed capability of the alternator and its rotor assembly 10. Recent tests indicate the maximum speed increases by about 10%. At the same time, DC output current of the alternator is increased approximately 10% at low speed regions. By reducing the deflection, the air space between the rotor and the stator can also be reduced. Prior to the invention, the space in between the rotor and stator was approximately 0.35 to 0.4 mm, while the spacing now can be between 0.25 and 0.35 mm. Among other things, this increases the output of the alternator.

Figure 3:
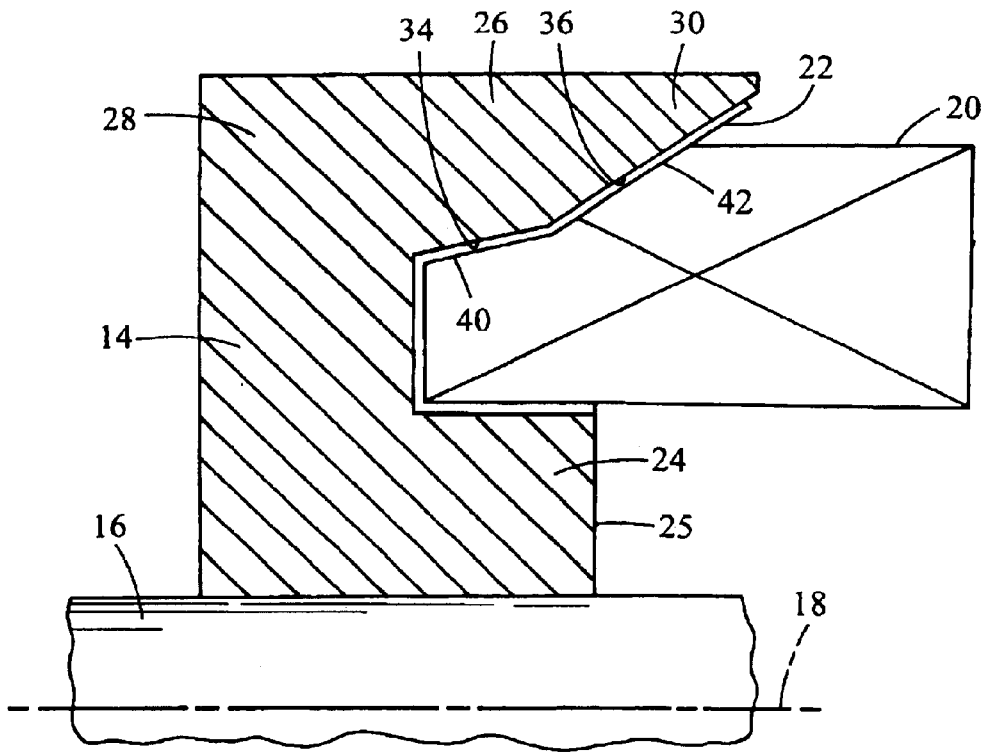
FIG. 3 is a cross-sectional view, partially cut away, of the pole depicted in FIG. 2 but having the field coil in place.

Turning now to FIG. 3, a cross-sectional view similar to FIG. 2 has been depicted, but now shows the field coil 20 in relation to the pole 14. Notably, the field coil 20 conforms to the inner surface 32 of the pole finger 26. Specifically, the field coil 20 includes an outer surface having a first portion 40 which is disposed at an angle corresponding to the first portion 34 of the inner surface 32. Similarly, a second portion 42 of the outer surface of the field coil 20 is disposed at a second angle corresponding to the angle of the second portion 36 of the inner surface 32. While the field coil 20 can be wound in this shape, it is preferred that the field coil be deformed during assembly by the pole 14 and its pole finger 26. As described in copending application Ser. No. 10/316, 771, the disclosure of which is incorporated herein by reference, the pole finger 26 can exert a force on the field coil 20 to cause deformation of the same, as well as to increase the density of the winding. The field coil 20 has an outer surface which preferably extends along at least the first portion 34 of the inner surface, and most preferably extends along at least a part of the second portion 36 of the inner surface 32.

Figure 4:
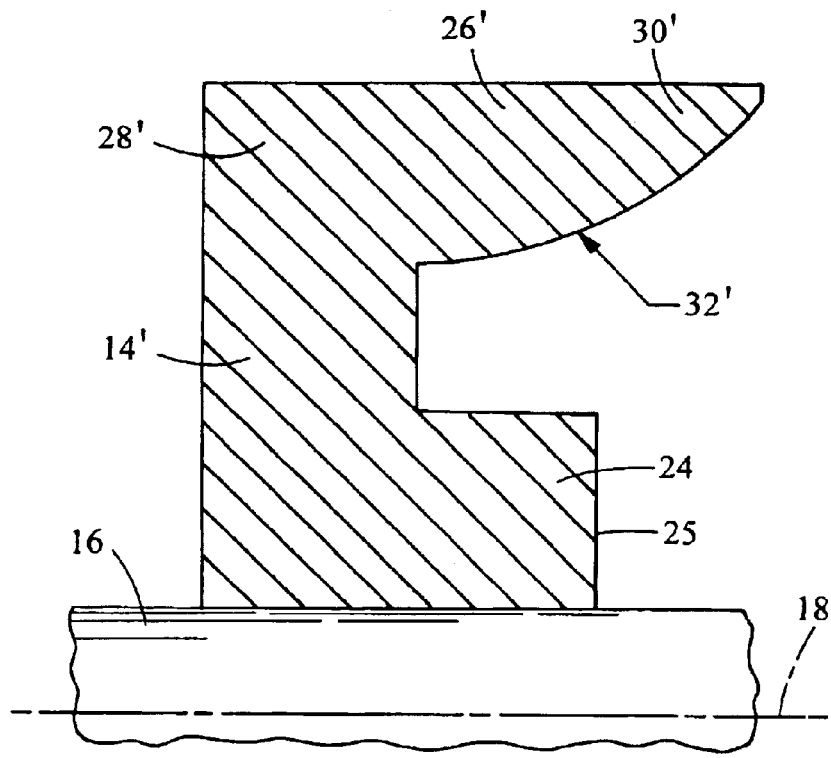
FIG. 4 is a cross-sectional view, partially cut away, of another embodiment of a pole for forming the rotor assembly and alternator in accordance with the teachings of the present invention.

Other constructions of the inner surface 32 of the pole finger 26 may also employ the principles of the present invention to achieve the aforementioned benefits. For example, and as depicted in FIG. 4, the inner surface 32' may be curved. Preferably, the curve is of increasing slope as the pole finger 26' extends from its root vicinity 28' to its tip vicinity 30'. The curve shape of the inner surface 32' may follow a parabolic curve, an exponential curve, or any other curve of increasing slope.

Figure 5:
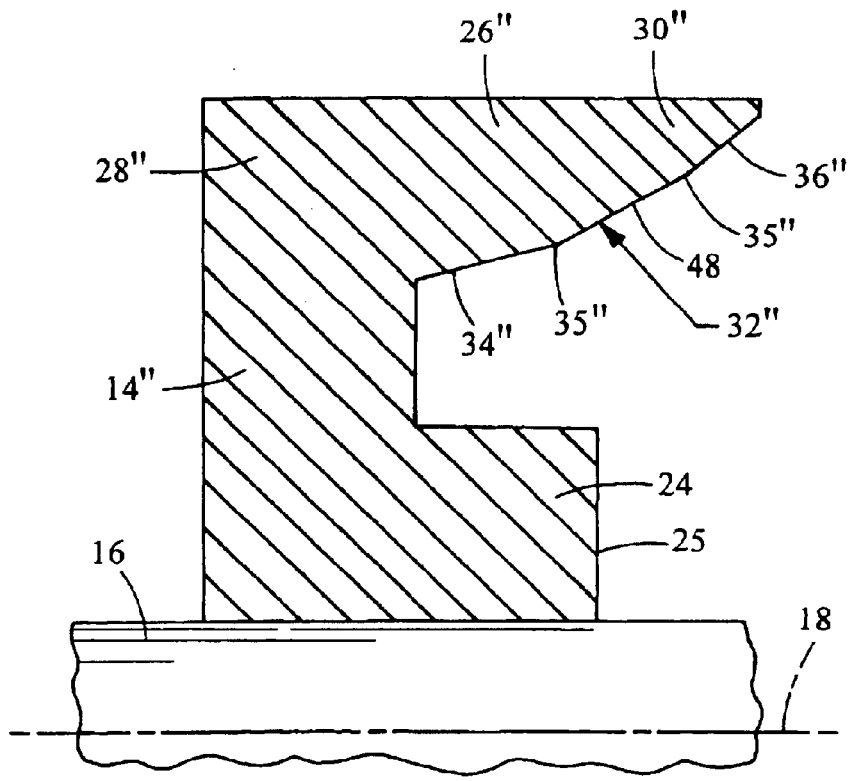
FIG. 5 is a cross-sectional view, partially cut away, of another embodiment of a pole for forming the rotor assembly and alternator in accordance with the teachings of the present invention.

Similarly, another construction of the inner surface 32 is shown in FIG. 5 as 32". Here, it is shown how the inner surface 32" may comprise more than two angled portions. As shown, the inner surface 32" includes a first portion 34" located in the pole root vicinity 28", and a second portion 36" located at the pole tip vicinity 30". The inner surface 32" also includes a third portion 48 disposed between the first and second portions 34", 36" thereby defining two transition points 35". It will be recognized that additional surface portions may also be employed at different angles. In the embodiment depicted in FIG. 5, the first portion 34" is preferably disposed at about 14°, while the second portion 36" is preferably disposed at about 25°, as in the prior embodiment. Here, the third portion 48 is preferably disposed at about 18°, although it can be disposed at any angle between the angles (here 140 and 25°) of the first and second portions 34", 36".

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A rotor assembly for an alternator comprising:
   a rotor shaft defining a central axis;
   a field coil wound on an insulative bobbin;
   a pair of poles mounted on the shaft around the field coil and bobbin, each of the poles including a pole core and a plurality of pole fingers;
   the plurality of pole fingers each having an inner surface facing the field coil, the inner surface having a first portion disposed at a first angle relative to the central axis and a second portion disposed at a second angle relative to the central axis, the first and second angles being different;
   the field coil extending along the first portion and at least a part of the second portion of the inner surface.

2. The rotor assembly of claim 1, wherein a plurality of portions of the field coil located under the plurality of pole fingers have an outer surface shaped to correspond to the inner surface.

3. The rotor assembly of claim 2, wherein the outer surface of the plurality of portions of the field coil have third and fourth portions disposed at angles corresponding to the first and second portions of the inner surface, respectively.

4. The rotor assembly of claim 1, wherein the plurality of pole fingers exerts a force of the field coil and deforms the field coil.

5. The rotor assembly of claim 1, wherein the second angle is greater than the first angle.

6. The rotor assembly of claim 1, wherein the first and second angles differ by about 8 degrees.

7. The rotor assembly of claim 1, wherein the first angle is less than 18 degrees.

8. The rotor assembly of claim 7, wherein the first angle is approximately 15 degrees.

9. The rotor assembly of claim 1, wherein the second angle is greater than 18 degrees.

10. The rotor assembly of claim 9, wherein the second angle is approximately 24 degrees.

11. The rotor assembly of claim 1, wherein the inner surface has a third portion disposed at a third angle relative to the central axis, the third angle being different from the first and second angles.

12. The rotor assembly of claim 11, wherein the field coil extends along the third portion of the inner surface.

13. The rotor assembly of claim 1, further comprising a transition line defined by the first and second portions, the transition line axially spaced on the axial center of the rotor assembly.

14. The rotor assembly of claim 1, further comprising a transition line defined by the first and second portions, the transition line axially spaced from an axial center of the rotor assembly.

15. The rotor assembly of claim 1, wherein the first portion extends an axial distance less than the second portion.

16. A rotor assembly for an alternator comprising:
   a rotor shaft defining a central axis;
   a field coil wound on an insulative bobbin;
   a pair of poles mounted on the shaft around the field coil and bobbin, each of the poles including a pole core and a plurality of pole fingers; and
   the plurality of pole fingers each having a pole root, a pole tip, and an inner surface facing the field coil, the inner surface having a curved shape increasing in slope from the pole root to the pole tip.

17. The rotor assembly of claim 16, wherein the curved shape is parabolic.

18. The rotor assembly of claim 16, wherein the curved shape is exponential.

19. The rotor assembly of claim 16, wherein a plurality of portions of the field coil under the plurality of pole fingers have a curved outer surface shaped to correspond to the inner surface.

20. The rotor assembly of claim 16, wherein the field coil extends along at least a portion of the inner surface of the plurality of pole fingers.

* * * * *